US011162590B2

(12) United States Patent
Crudu et al.

(10) Patent No.: US 11,162,590 B2
(45) Date of Patent: Nov. 2, 2021

(54) SEALING RING WITH A 3D-PRINTED INLAY

(71) Applicant: Trelleborg Sealing Solutions Germany GmbH, Stuttgart (DE)

(72) Inventors: Monica Crudu, Stuttgart (DE); Martin Franz, Wannweil (DE); Gianella Attard, Mosta (MT); Matthias Keck, Renningen (DE); Christoph Wehmann, Stuttgart (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 140 days.

(21) Appl. No.: 16/675,216

(22) Filed: Nov. 5, 2019

(65) Prior Publication Data

US 2020/0072355 A1 Mar. 5, 2020

Related U.S. Application Data

(63) Continuation of application No. PCT/EP2018/061987, filed on May 9, 2018.

(30) Foreign Application Priority Data

May 17, 2017 (DE) ..................... 10 2017 208 285.2

(51) Int. Cl.
*F16J 15/32* (2016.01)
*F16J 15/328* (2016.01)
(Continued)

(52) U.S. Cl.
CPC ......... *F16J 15/328* (2013.01); *F16J 15/3284* (2013.01); *F16J 15/442* (2013.01); *B33Y 80/00* (2014.12)

(58) Field of Classification Search
CPC ...... F16J 15/32; F16J 15/3204; F16J 15/3248; F16J 15/3252; F16J 15/328; F16J 15/3284; F16J 15/442; B33Y 80/00
See application file for complete search history.

(56) References Cited

U.S. PATENT DOCUMENTS 2,815,973 A * 12/1957 Jackson ............... F16J 15/3236
277/572
3,576,328 A * 4/1971 Vose .................... F16J 15/3216
277/558
(Continued)

FOREIGN PATENT DOCUMENTS

DE  10 2013 104069 A1   10/2014
GB     2 521 394 A        6/2015
(Continued)

*Primary Examiner* — Gilbert Y Lee
(74) *Attorney, Agent, or Firm* — Hackler Daghighian Martino & Novak (57) ABSTRACT

A sealing ring, in particular a radial shaft sealing ring or a rod sealing ring, can be used for sealing a sealing gap which is arranged between two machine elements. The sealing ring comprises an elastically deformable polymer material and a supporting ring which is embedded in a positively locking manner in the polymer material at least in sections. The supporting ring is configured as a 3D-printed part with a multiple-layer construction of its material at least in sections. The material of the supporting ring has a greater modulus than the polymer material. The supporting ring can be widened elastically in a radial direction with respect to the center axis of the sealing ring, and has dimensionally stable first ring segments which are connected to one another in an articulated manner in the circumferential direction of the sealing ring.

13 Claims, 11 Drawing Sheets

(51) Int. Cl.
  *F16J 15/3284* (2016.01)
  *F16J 15/44* (2006.01)
  *B33Y 80/00* (2015.01)

(56) References Cited

U.S. PATENT DOCUMENTS

| | | | | |
|---|---|---|---|---|
| 4,570,944 | A * | 2/1986 | Traub | F16J 15/56 |
| | | | | 277/572 |
| 7,887,062 | B2 * | 2/2011 | Dahlheimer | F16J 15/3244 |
| | | | | 277/572 |

FOREIGN PATENT DOCUMENTS

| | | |
|---|---|---|
| GB | 2 528 037 A | 1/2016 |
| WO | 2016 167770 A1 | 10/2016 |

* cited by examiner

SEALING RING WITH A 3D-PRINTED INLAY

CROSS-REFERENCE TO RELATED APPLICATIONS

This continuation application claims priority to PCT/EP2018/061987 filed on May 9, 2018 which has published as WO 2018/210653 A1 and also the German application number 10 2017 208 285.2 filed on May 17, 2017, the entire contents of which are fully incorporated herein with these references.

FIELD OF THE INVENTION

The invention relates to a sealing ring comprising an elastically deformable polymer material and a supporting ring which is embedded in a positively locking manner in the polymer material at least in sections.

BACKGROUND OF THE INVENTION

Such sealing rings have long been used in practice in the shape of (axial or radial) shaft sealing rings or also in the shape of rod or piston sealing rings.

As a rule, the supporting rings are configured to be dimensionally stable in a radial or axial direction with respect to the center axis of the sealing ring and usually have a not very complex circular cross-sectional shape.

The supporting rings as well as the polymer material are each manufactured as injection-molded parts from different materials, especially during mass manufacturing of the sealing rings.

DE 10 2013 104 069 A1 discloses a sealing ring in which the supporting ring is configured as a 3D-printed part made of hard plastic having a greater modulus of elasticity than the polymer material. The object of the invention is to specify a sealing ring which is simple and inexpensive to produce and which offers a wider field of application.

SUMMARY OF THE INVENTION

The sealing ring according to the invention is characterized in that the supporting ring is configured as a 3D-printed part with a layered material construction and wherein the material of the supporting ring has a greater modulus than the polymer material. As a result, the sealing ring can be manufactured in a simple and inexpensive manner. The supporting ring, configured as a 3D-printed part, can have a more complex construction and therefore functionalities not previously achieved. As the material of the supporting ring has a greater modulus than the polymer material, the supporting ring can reinforce the polymer material, i.e. limit its deformation under pressure and thus counteract undesirable deformation of the polymer material and thereby of the sealing ring. The polymer material can be molded onto the supporting ring according to the invention, as is the case with the sealing rings available on the market. The supporting ring can be widened elastically in a radial direction with respect to the center axis of the sealing ring. In this case, the supporting ring has a double function. Firstly, it serves to reinforce the polymer material and secondly, the supporting ring can be used to achieve a prestressed sealing contact between the sealing ring and a dynamically sealable sealing surface of a machine element.

According to the invention, the supporting ring has dimensionally stable first ring segments which are arranged one behind the other in the circumferential direction of the sealing ring and which are connected to one another in an articulated manner. The dimensionally stable first ring elements provide the load-bearing capacity of the supporting ring required for supporting the elastically deformable polymer material. The articulated connection of the dimensionally stable first ring elements allows the elastic widening of the supporting ring, which is advantageous for prestressing the polymer material relative to the dynamic sealing surface of a machine element. Additionally, the sealing ring can also be deformed non-rotationally symmetrically, for example in the shape of a kidney, which is advantageous for the mounting of the sealing ring.

According to the invention, the polymer material of the sealing ring preferably has a lower melting point than the material of the supporting ring. This ensures that the material of the supporting ring does not melt during the production process. This allows filigree structures and hence structures of the supporting ring that are particularly sensitive to thermal damage to be reliably protected from damage or loss of function. This also helps to keep production tolerances low.

According to the invention, the dimensionally stable first ring segments can each be formed by a plurality of profile webs which are arranged one behind the other at a distance from one another in the direction of the center axis of the sealing ring, wherein the profile webs of each of the two closely adjacent first ring segments alternately mesh with one another and are connected to one another in the area of their crossing points. With this type of construction, the supporting ring can stiffen the polymer material in the sense of an endoskeleton. Due to the plurality of profile webs and the intermediate spaces between them, a particularly durable and mechanically resilient connection between the polymer material and the supporting ring can be achieved. An undesirable loss of shape and the associated loss of function of the sealing ring can therefore be reliably counteracted.

The profile webs of the first ring segments are arranged so as to run at an acute angle $\alpha$ to the radius of the clamping ring in the unloaded and preferably also in the loaded installation state of the clamping ring. When the sealing ring or the supporting ring expands, the angle $\alpha$ increases accordingly. The profile webs or the first ring segments of the supporting ring can each be of the same construction and, in particular, their respective cross-sectional shape, length and thickness can correspond to each other.

According to an alternative embodiment of the invention, the first ring segments can also be arranged spaced apart from one another in the circumferential direction of the supporting ring and each can be connected to one another via a second ring segment which is elastically deformable at least in sections.

In this case, the articulated connection of the first ring segments is thus effected by the second ring segments. In the simplest design case, these second ring segments can each have at least one pair of profile legs with a first and a second profile leg, which are connected to each other via a back section and arranged as to run obliquely relative to each other, wherein the two profile legs can be spread elastically relative to each other. The second ring segments are therefore V-shaped or U-shaped. By spreading the second ring segments, the inner or outer cross-section of the supporting ring can be increased and the sealing ring widened.

According to the invention, at least a part of the second ring segments can comprise a plurality of profile leg pairs which are arranged one behind the other in the circumferential direction and connected to each other firmly-bonded in an end-to-end manner. The second ring segments therefore have an overall multiple meandering shape, which further improves the elasticity of the supporting ring.

According to a particularly preferred embodiment of the invention, the surface of the sealing ring on one or a plurality of front side(s) and/or on one or a plurality of circumferential side(s) is formed by the support ring at least in sections. The supporting ring can therefore be used to guide, mount or position and fasten the sealing ring to a seal retaining structure of a machine part, for example a retaining groove. This can also be used to counteract an undesired extrusion of the sealing ring in a sealing gap due to pressure being applied to it. Additionally, this construction shape of the sealing ring can offer manufacturing advantages as the supporting ring can be easily positioned in a molding tool in order to inject the polymer material onto the supporting ring.

If the supporting ring protrudes beyond a surface section of the sealing ring formed by the polymer material, the polymer material of the sealing ring can be protected particularly effectively against mechanical or thermal overloading by friction on the sealing surface to be dynamically sealed during mounting and also during operation of the sealing ring. Additionally, the supporting ring can serve as a spacer to other functional structures, such as a groove flank of the above-mentioned retaining groove of a machine part. Therefore a pressure activation of the sealing lip of the sealing ring can be ensured.

The supporting ring can also be configured to be dimensionally stable in a radial direction with respect to the center axis of the sealing ring, i.e. not deformable due to pressure loads occurring during operation of the seal. Therefore, the supporting ring can offer a particularly high load-bearing capacity and support the polymer material particularly effectively or stiffen it in specified volume areas.

According to the invention, the supporting ring preferably has at least in sections a L-, T- or a cross-shaped cross-sectional shape. Therefore a high torsional stability of the sealing ring can be achieved. Individual profile legs of the supporting ring can also be used to guide the sealing ring and extend or protrude to the surface or above the surface of the polymer material.

According to a preferred embodiment of the invention, the supporting ring has or forms at least one fluid channel through which a low-pressure side of the sealing ring can be fluidically connected to a high-pressure side of the sealing ring during operation of the sealing ring. The fluid channel thus extends in an axial direction with respect to the center axis of the sealing ring in the case of a sealing ring formed as a radial shaft sealing ring or as a rod or piston seal. In the case of a sealing ring formed as an axial shaft sealing ring, the fluid channel extends in a radial direction. The supporting ring can also have a plurality of such fluid channels. As the supporting ring forms the fluid channel, i.e. has a wall enclosing the fluid channel, the production of the sealing ring can be further simplified and additional cost-intensive manufacturing or reworking steps of the sealing ring can be avoided.

According to the invention, the sealing ring preferably has a sealing lip with a dynamic sealing edge, wherein the supporting ring is arranged within the sealing lip at least in sections. The supporting ring can extend into the sealing lip section in sections with individual projections, such as tongue-shaped projections, or the sealing ring can have a surrounding sealing lip supporting section. The sealing ring can extend up to or almost up to the free end of the sealing lip and thus stiffen the sealing lip in the desired manner. Although such sealing lips often have only a small material strength (thickness), a sufficient supporting effect can also be achieved in the area of the sealing lip by the supporting ring configured according to the invention as a 3D-printed part, even with the necessary—at least in sections—filigree design of the supporting ring in the area of the sealing lip.

The supporting ring can be provided with axially or radially running through bores into which the polymer material extends or through which the polymer material extends in order to achieve the most durable and load-bearing mechanical connection possible with the polymer material. It is obvious that these through bores must be distinguished from the ring opening of the supporting ring or the sealing ring which is surrounded by the supporting ring in the radial direction.

A particularly preferred option is to provide at least some of the first ring segments with a through bore, which preferably extends through the respective first ring segment in the circumferential direction of the clamping ring. In this case, the first ring segments provided with the through bores are configured as hollow profiles. Therefore the use of material for the supporting ring can be kept low.

According to the invention, the first ring segments can be identical in construction in the simplest case. The elastically deformable second ring segments mentioned above can also be of identical construction.

It is clear that the supporting ring is made of or consists of a material suitable for 3D printing. For example, the supporting ring can consist of a plastic material, in particular a thermoplastic.

A method for producing a sealing ring as described above comprises the following steps:

Creating the supporting ring using a 3D printing method;
Molding the polymer material onto the supporting ring to create the sealing ring.

The production method makes it possible to provide sealing rings having a supporting ring in a simple and cost-effective manner and with low manufacturing tolerances. In 3D printing, the supporting ring is constructed in layers. Plastics, synthetic resins, ceramics and metals can be used as materials for the supporting ring. By 3D printing of the supporting ring, its shape and supporting behavior can easily be adapted to locally different requirements during operation of the sealing ring. Even filigree structures of the supporting ring can be realized reliably and at low cost with the supporting ring created by 3D printing.

In particular, the so-called selective laser sintering can be achieved as a 3D printing method. In this 3D printing method, the supporting ring is constructed by layer-wise local fusion of powdery material by means of selective laser radiation. PEEK (polyether ketone) can be used in particular for this purpose, which enables very high accuracy or spatial resolution, precision and high temperature loading capacity of the supporting ring with a continuous operating temperature of 260° Celsius.

Further advantages of the invention result from the description and the drawings. Likewise, according to the invention, the above-mentioned features and those which are to be explained below can each be used individually for themselves or in a plurality in combinations of any kind.

BRIEF DESCRIPTION OF THE DRAWINGS

The invention is explained in more detail below using the exemplary embodiments shown in the drawings. The embodiments shown and described are not to be understood as an exhaustive enumeration, but rather as an exemplary description of the invention.

In which.

DETAILED DESCRIPTION OF THE PREFERRED EMBODIMENTS

Figure 1:
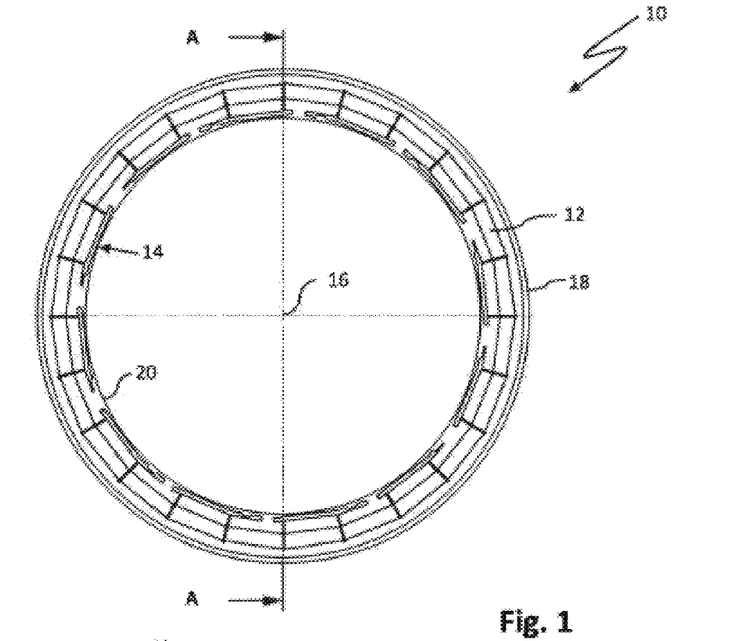
FIG. 1 is a sealing ring having a base body made of polymer material and a supporting ring integrated in the polymer material, in a side view.

FIG. 1 shows a sealing ring 10 which comprises an elastically deformable polymer material 12 and a supporting ring 14 which is embedded in the polymer material 12 at least in sections. The sealing ring 10 can, for example, be configured as a radial shaft sealing ring or as a piston or rod sealing ring. The sealing ring 10 is here exemplarily sealing internally in the radial direction with regard to its center axis 16. The sealing ring 10 has an outer circumferential side 18 in the radial direction and an inner circumferential side 20 in the radial direction. The polymer material 12 of the sealing ring 10 can be viscoplastic or rubber-elastic. In the first case, the polymer material 12 can be polyurethane (PU), for example, or another viscoplastic polymer material familiar to the person skilled in the art. Rubber or other known elastomers such as ethylene-propylene-diene rubber (EPDM) can be used as rubber-elastic deformable materials.

The supporting ring 14 is configured as a 3D-printed part having a layered material construction. The material of the supporting ring 14 has a greater modulus than the polymer material 12. The polymer material 12 is molded onto the supporting ring 14. It should be noted that the polymer material 12 has a lower melting point than the material of the supporting ring 14. The supporting ring can be made in particular of PEEK (polyether ether ketone).

Figure 2:
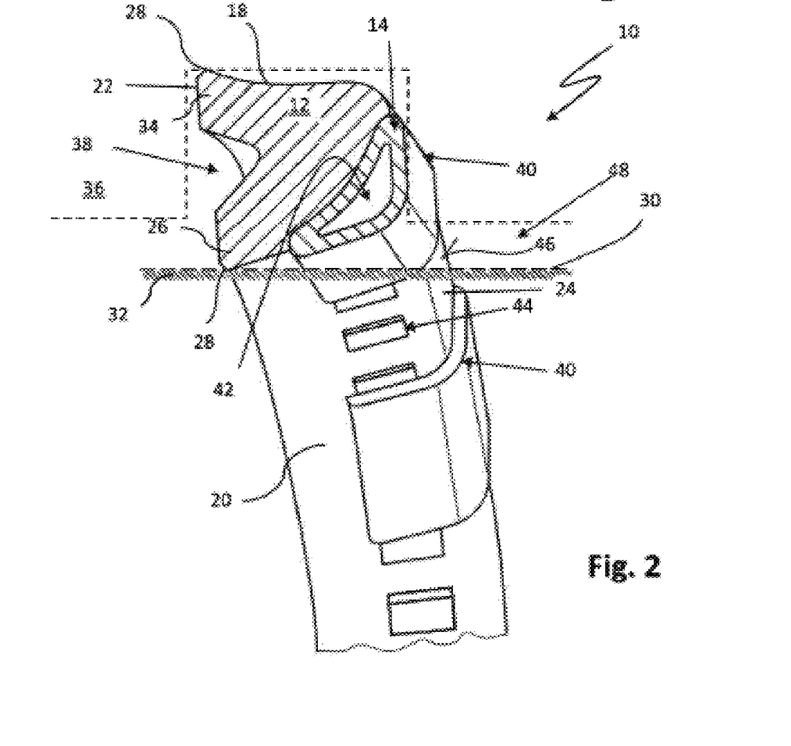
FIG. 2 is the sealing ring according to FIG. 1 in a sectional perspective representation.

FIG. 2 shows the sealing ring 10 according to FIG. 1 in a sectional cross-section along the sectional plane marked A-A in FIG. 1. The sealing ring 10 has an overall U-shaped cross-sectional shape. A first and a second front side of the sealing ring are marked 22 and 24 respectively. A dynamic sealing lip 26 having a sealing edge 28 is formed on the sealing ring. During operation of the sealing ring 10, the sealing edge 28 is in dynamic sealing contact with a mating or sealing surface 30 of a first machine element 32 shown in FIG. 2 with a dashed line. The sealing ring 10 can be provided with a statically sealing sealing section or a static sealing lip 34, which during operation bears statically sealing against a second machine element 36 retaining the seal 10.

A groove 38 is formed between the two sealing lips 26, 34 to enable pressure activation of the dynamically sealing lip 26 and here also of the statically sealing lip 34.

The supporting ring 14 has first ring segments 40 which are arranged at a distance from each other, preferably regularly, in the circumferential direction of the sealing ring 10 or of the supporting ring 14. The first ring segments 40 are dimensionally stable. As a result of the forces acting on the sealing ring during operation, no significant deformation of the first ring segments 40 is caused. These first ring segments 40 can, for example, have a triangular cross-sectional shape according to FIG. 2. For a mechanically loadable connection of the polymer material 12 with the supporting ring 14, the first ring segments 40 can each be provided with a through bore 42. The through bores 42 preferably extend in the circumferential direction of the sealing ring 10 through the respective first ring segment 40. The polymer material 12 can engage in the through bores 42 and fill them partially or advantageously completely.

The first ring segments are connected to one another in an articulated manner by second ring segments 44, as explained in more detail below in connection with FIGS. 3 to 5.

According to FIG. 2, the supporting ring 14 can form the surface 46 of the sealing ring 10 at least in sections on one or a plurality of sides of the sealing ring 10. The supporting ring 14 therefore limits the sealing ring 10 to the outside at least in sections. This means that the supporting ring 14 is exposed at least in sections, i.e. not covered by the polymer material 12. In the exemplary embodiment shown in FIG. 2, this is the case in the area of the radially inner circumferential side 20 and the second front side 24 of the sealing ring 10 to be arranged on the low-pressure side in the operation state of the sealing ring 10.

The first ring segments 40 can protrude over the polymer material to the outside. According to FIG. 2, the first ring segments 40 protrude beyond the polymer material 12 on the radially inner circumferential side 20 of the sealing ring 10 in the radial inward direction. In the area of the second front side 24, the first ring segments 40 protrude to the outside in an axial direction over the polymer material. Therefore, the supporting ring 14 can, firstly, provide effective guidance of the sealing ring 10 on a dynamic sealing surface 30 of the first machine element facing the radially inner circumferential side 20. A mechanical overloading of the polymer material 12 of the sealing ring, especially in the area of the dynamic sealing lip 26, can therefore be counteracted. Additionally, the supporting ring 14 can provide protection against unwanted extrusion of the polymer material 12 into a sealing gap 48 arranged between the machine elements 32, 36 to be sealed against each other.

Figure 3:
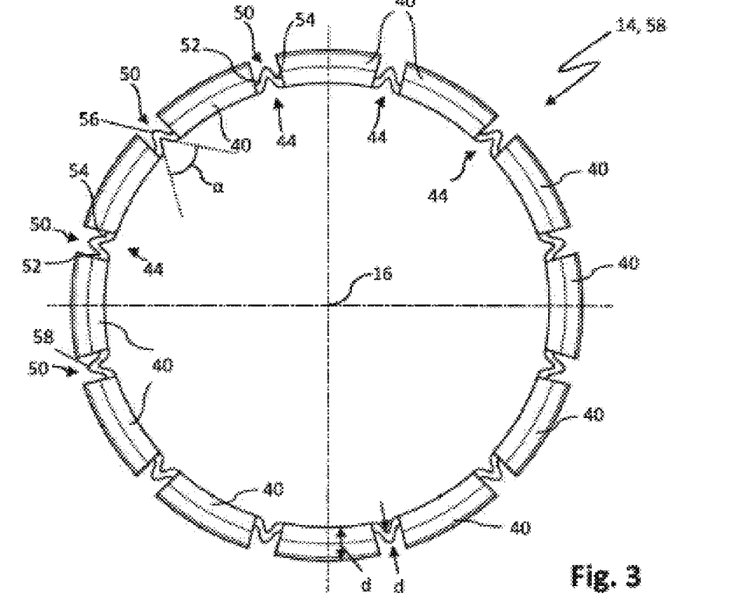
FIG. 3 is the supporting ring of the sealing ring from FIG. 2 in an isolated view.

FIG. 3 shows an embodiment of the supporting ring 14 of the sealing ring 10 shown in FIG. 1 in an isolated side view. The second ring segments 44 have at least one profile leg pair 50 having a first and a second profile leg 52, 54. The two profile legs 52, 54 are arranged at an angle to each other and together enclose an acute angle α. The profile legs 52, 54 are connected by a back section 56. Altogether, the second ring segments 44 therefore have a V-shape in the exemplary embodiment shown in FIG. 3. The second ring segments 44 are each connected at both ends to one of the first ring segments 40. The second ring segments 44 of the supporting ring have a smaller thickness d than the first ring segments 40. The second ring segments 44 thus represent material-weakened ring sections of the supporting ring 14. The two profile legs 52, 54 of the second ring sections 44 can each be spread out against an elastic resilience inherent in the material of the supporting ring 14. Therefore, the supporting ring 14 also has the function of a prestressing ring or prestressing element 58, by means of which the polymer material 12, here in particular the dynamic sealing lip 26 with its sealing edge 28 can be pressed in the radial direction against the above-mentioned sealing surface 30 (FIG. 2) of a machine element 32. The supporting ring 14 and therefore the sealing ring 10 are thus elastically expandable or non-round deformable in the radial direction.

Figure 4:
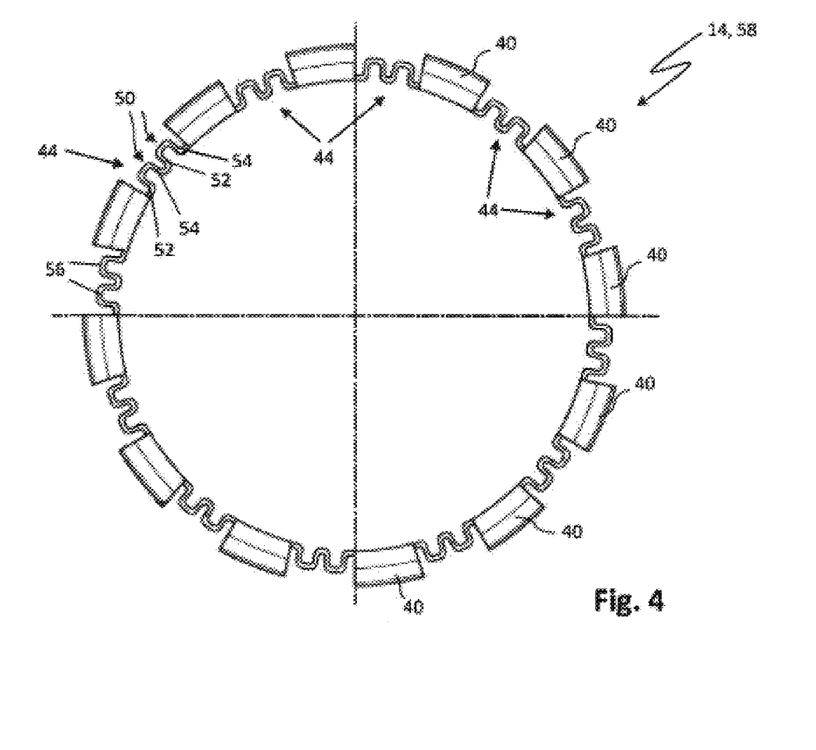
FIG. 4 is an alternative exemplary embodiment of the supporting ring of the sealing ring from FIG. 2 in an isolated view.
Figure 5:
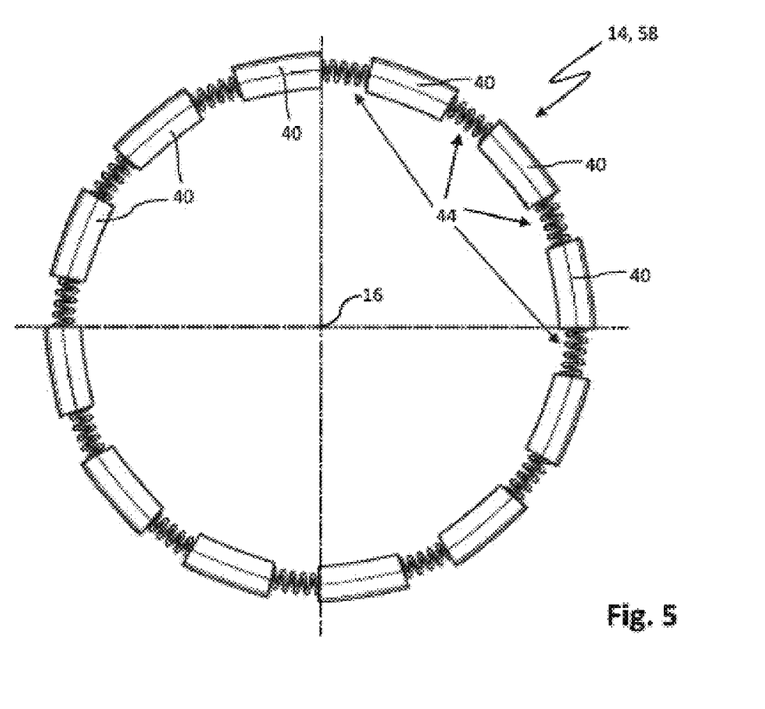
FIG. 5 is a further alternative exemplary embodiment of the supporting ring of the sealing ring from FIG. 2 in an isolated view.

The second ring sections 44 of the supporting ring 14 can also each have a plurality of profile leg pairs 50, which are arranged one behind the other in the circumferential direction and connected to each other firmly-bonded in an end-to-end manner, as shown in the FIGS. 4 and 5. The two profile legs 52, 54 of a profile leg pair can also be arranged substantially parallel to each other in the unloaded state of the supporting ring 14. In the unloaded state of the supporting ring 14, the profile leg pairs 50 and the corresponding back section are therefore arranged in a U-shaped or spiral spring-shaped manner (FIG. 5).

Due to the segmented construction of the supporting ring 14, it functions as a segment clamping ring, through which a variable contact pressure profile of the sealing lip 26 against the dynamic sealing surface 30 in the circumferential direction of the sealing ring 10 can be achieved. Thus, the sealing lip 26 in the area of the first (rigid) ring segments 40 of the supporting ring 14 can be prestressed more strongly against the sealing surface 30 than in the areas of the second ring segments 44. Overall, this can improve the lubrication of the contact surface area between the sealing lip or the dynamically sealing sealing edge 26 and the sealing surface 30.

Figure 6:
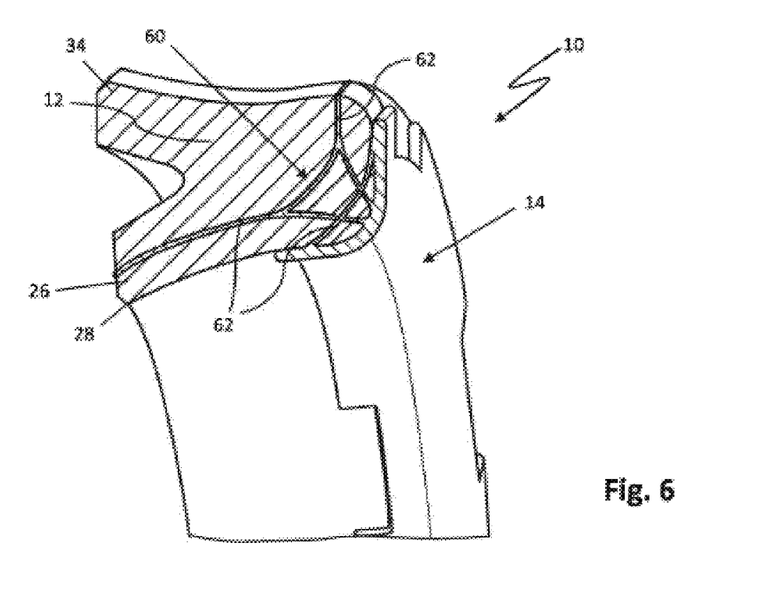
FIG. 6 is a sealing ring in which the integrated supporting ring has additional supporting structures in a sectional perspective partial view.

The supporting ring 14 can have additional supporting structures 60, as shown in the exemplary embodiment of a sealing ring 10 shown in FIG. 6. The supporting structures 60 can, for example, have one or a plurality of supporting extensions 62 which extend into the dynamic sealing lip 26 of the sealing ring 10. The supporting extensions 62 are preferably formed on one or a plurality of the first ring segments 40 of the supporting ring. It should be noted that the supporting extensions 62 of the sealing ring 10, which is configured here as a radial (shaft) sealing ring, can extend in the axial direction to the level of the sealing edge 28 of the dynamic sealing lip 26 or in the axial direction beyond the sealing edge 26. As the supporting ring 14 of the sealing ring 10 is configured as a 3D-printed part, the supporting structures 60 can be configured as a whole in the sense of an, optionally close-meshed, cross-linked framework, for example the first and second ring sections 40, 44 or the supporting structures 60 are arranged at least partially along the most important load lines (tension trajectories) of the sealing ring. The architecture of the supporting ring 14 is designed as to whether the respective sealing ring section or sealing ring part volume is predominantly exposed to compressive or bending and torsional forces during operation. This lightweight construction principle allows a minimized use of material for the supporting body 14 with sufficiently high stability and thereby a cost-effective manufacture of the sealing ring 10 as a whole. The construction of the sealing ring 10 also allows improved heat dissipation from the sealing ring 10 during operation.

Figure 7:
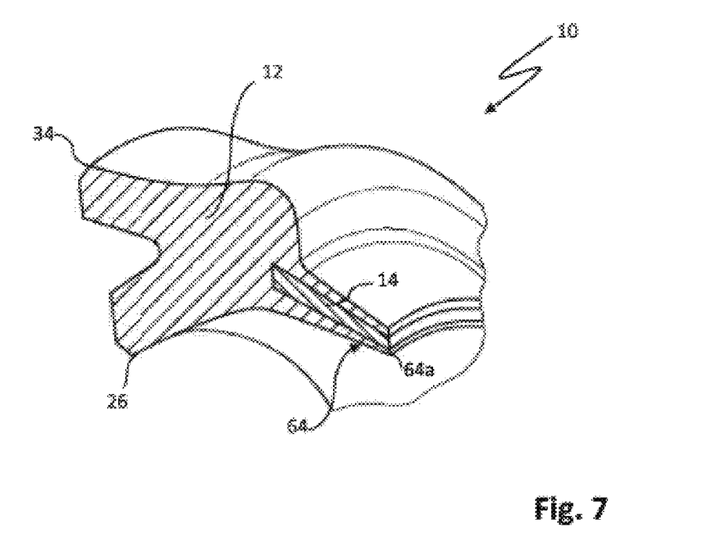
FIG. 7 is a sealing ring with a wiper lip reinforced by the supporting ring, in a sectional perspective detail view.
Figure 8:
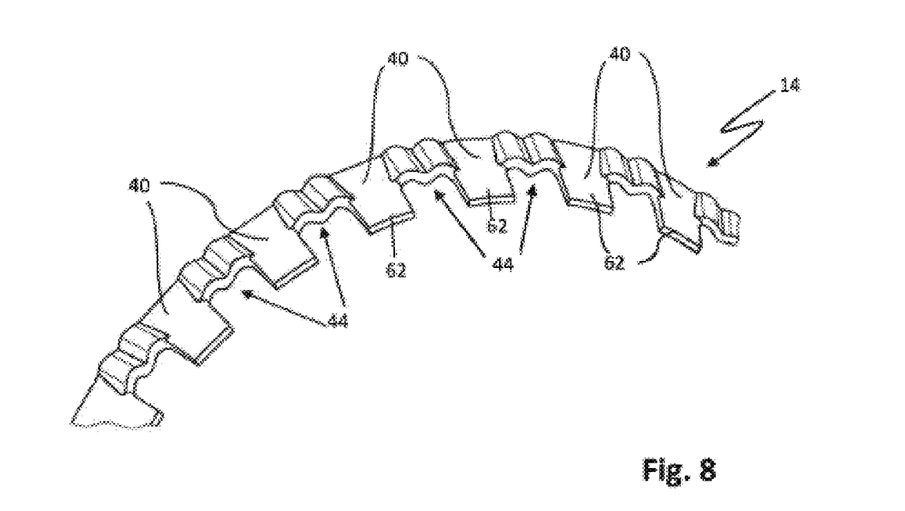
FIG. 8 is the supporting ring according to FIG. 7 in an isolated perspective detail view.

FIG. 7 shows a further exemplary embodiment of a sealing ring having a 3D-printed supporting ring. The supporting ring is shown in FIG. 8 in an isolated detail section. The first dimensionally stable ring segments 40 are made of solid material. A tongue-like supporting extension 62 is formed on each of the first ring segments 40, said extension extending from the respective first ring segment 40—here in the axial direction—into a wiper lip 64 of the sealing ring 10. The wiper lip has a wiper edge 64a, which is designed to contact the (dynamic) sealing surface of the first machine part (see FIG. 2). This wiper lip 64 is formed separately from the dynamic sealing lip 26 of the sealing ring 10. The supporting extension 62 here is formed from solid material.

Figure 9:
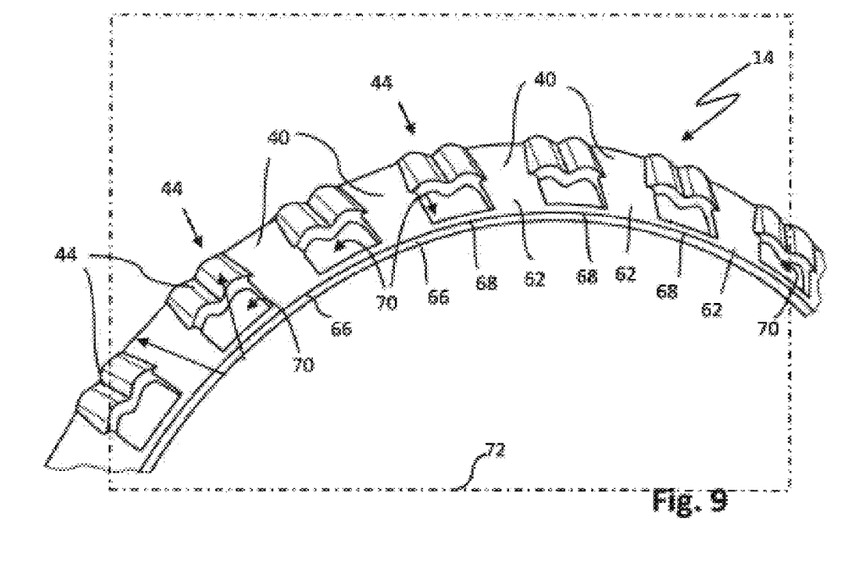
FIG. 9 is an alternative embodiment of the supporting ring shown in FIG. 7.

FIG. 9 shows a further supporting ring 14, which can be used for example with the sealing ring 10 shown in FIG. 7. The tongue-like supporting extensions 62 are here additionally connected to each other in the area of their free ends 66 via connecting webs 68. Thereby, openings 70 for the polymer material 12 (see FIG. 1) are formed between the second ring segments 44 and the connecting webs 68. In this embodiment, the supporting ring 14 can substantially only be elastically expandable in plane 72, which is spanned by its first ring segments 44. Thereby, the contact pressure of the wiper lip 64 of the sealing ring 10 against the associated sealing surface (mating surface) 30 (FIG. 3) can be adjusted almost independently of a contact pressure of the dynamic sealing lip 26 against the sealing surface 30. The ability of the dynamic sealing lip 26 to perform radially directed compensating movements under eccentric loads can therefore be maintained. As a result, unwanted mechanical overloading of the dynamic sealing lip 26 during operation can be reliably counteracted.

Figure 10:
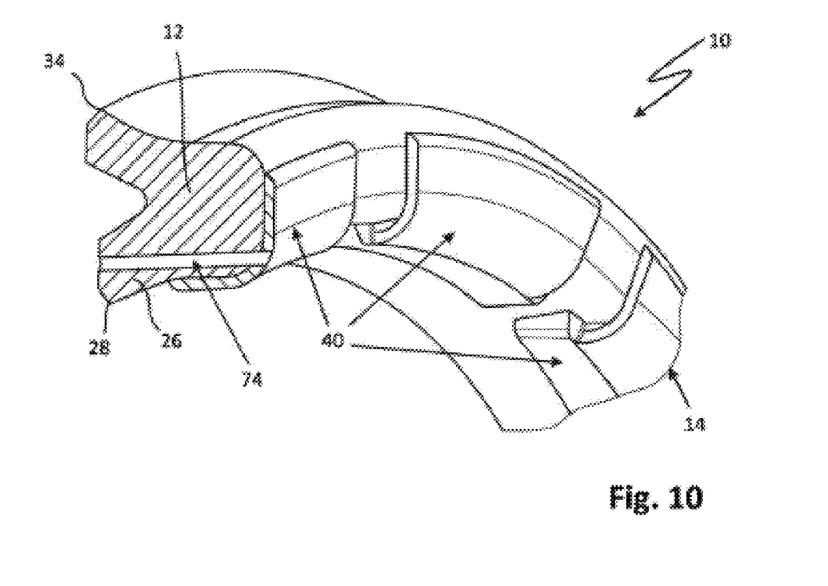
FIG. 10 is a sealing ring in which the supporting ring forms a plurality of flow channels that can be used to reduce pressure.

The supporting ring 14 can have or form at least one fluid channel 74 according to the exemplary embodiment shown in FIG. 10. The fluid channel 74 is arranged so as to run axially. During operation of the sealing ring 14, for example, a low-pressure side of the sealing ring 10 can be fluidically connected to a high-pressure side of the sealing ring 10. In the case of a so-called pressure reversal, a pressure equalization between the high-pressure side and the low-pressure side can be enabled.

Figure 11:
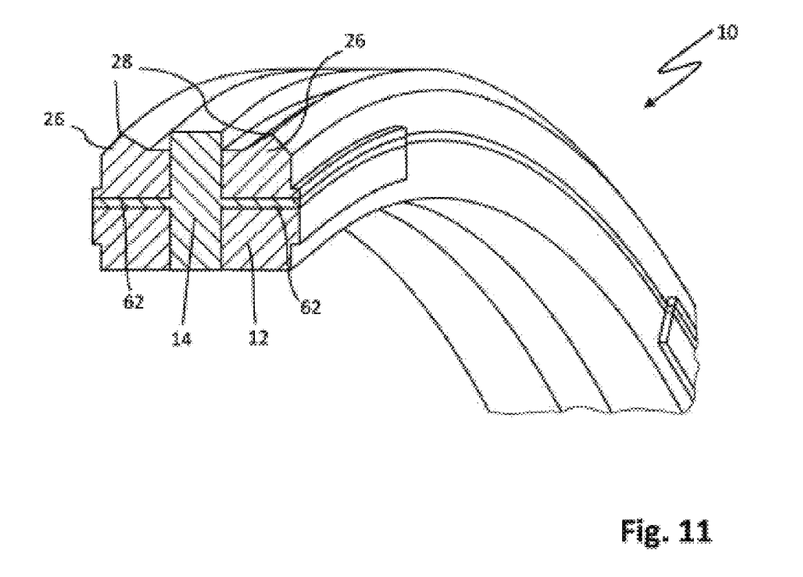
FIG. 11 is a further sealing ring in which the supporting ring has a cross-shaped cross-sectional shape at least in sections.
Figure 12:
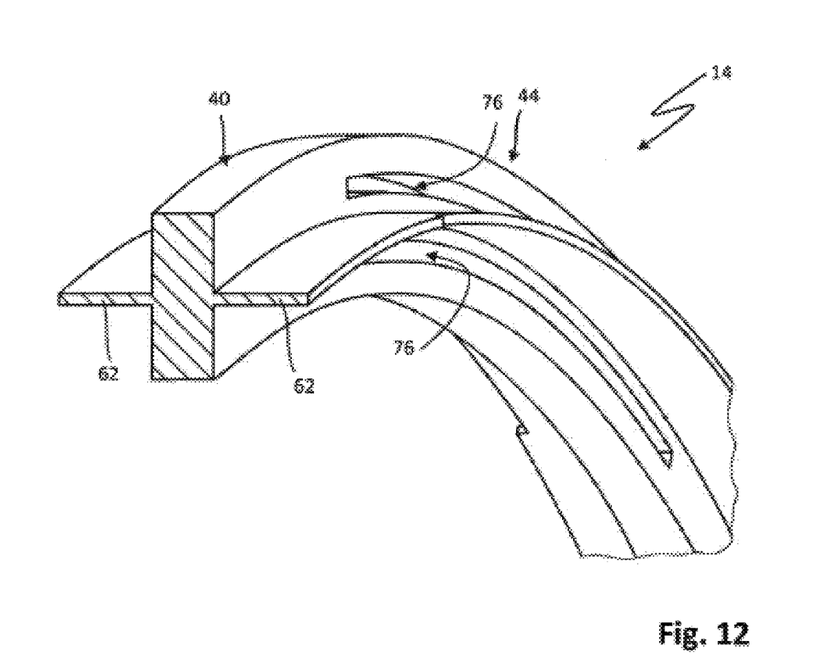
FIG. 12 is the supporting ring according to FIG. 11 in an isolated and sectional perspective partial view.
Figure 13:
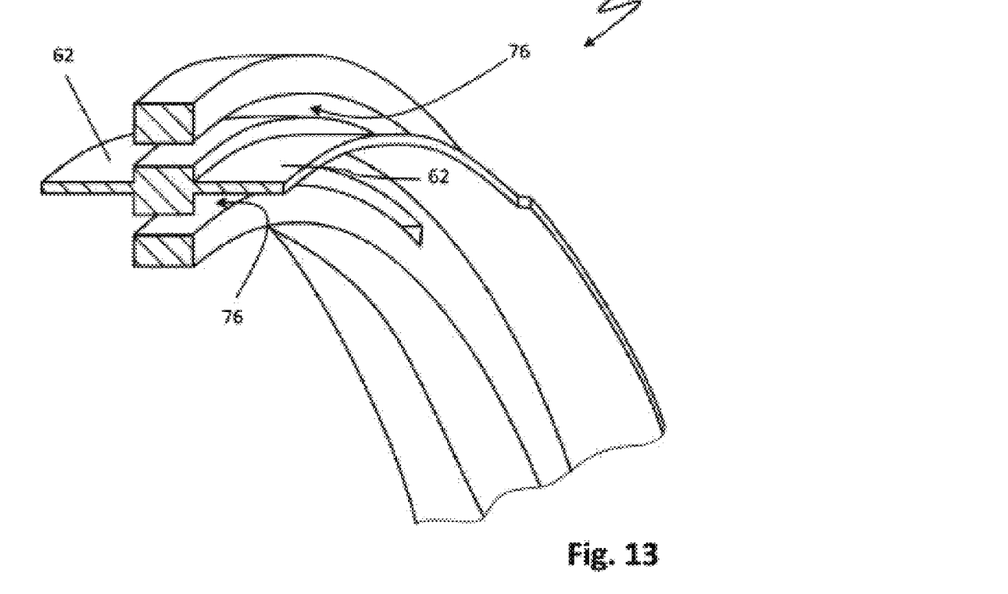
FIG. 13 is the supporting ring according to FIG. 11 in an isolated sectional perspective partial view, intersected at another location.

FIG. 11 shows a further sealing ring 10 having an integrated supporting ring in the form of a 3D-printed part. The supporting ring 14 is shown in FIGS. 12 and 13 each in an isolated view and in different sectional representations. The sealing ring 10 in this example is configured to seal externally in the radial direction. The sealing ring 10 has two dynamic sealing lips 26 on the outer circumference, each having a sealing edge 28. Also here, the sealing lips 26 are formed by the polymer material 12. According to FIGS. 12 and 13, the supporting ring 14 has first ring segments 40 and second ring segments 44 with wing-like supporting extensions 62 formed on them. The second ring segments 44 are provided with passage slots 76 arranged so as to run axially, which are penetrated or interspersed by the polymer material 12 of the sealing ring 10. The wing-like supporting extensions 62 can have a frontally stepped contour corresponding to the polymer material 12 and thus, for example, form projections with the polymer material 12, enabling fluid passage between the sealing ring 10 and a machine element (not shown).

According to FIG. 11, the supporting ring 14 can extend in the radial direction between the two sealing lips 26 and thus guide and support the sealing ring 10 on an associated dynamic sealing surface 30 (see FIG. 3) of a machine element (not shown).

Figure 14:
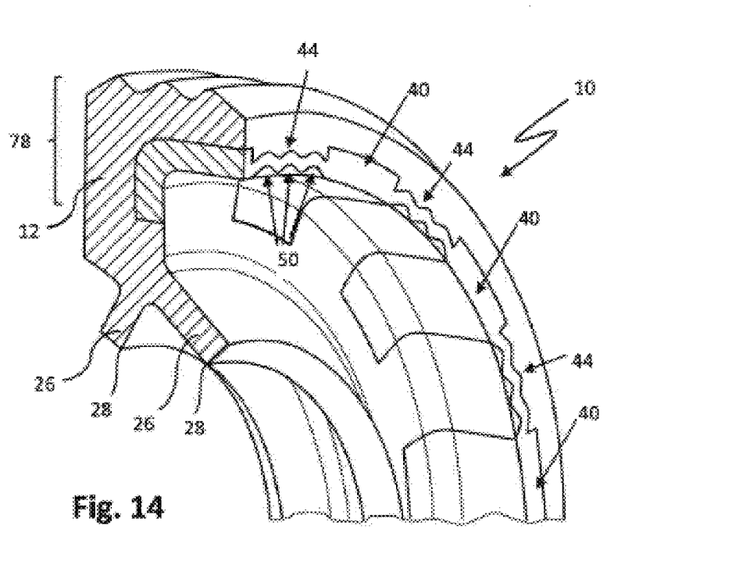
FIG. 14 is a sealing ring in which the supporting ring also serves to fasten the sealing ring in a retaining groove or similar, in a sectional perspective view.
Figure 15:
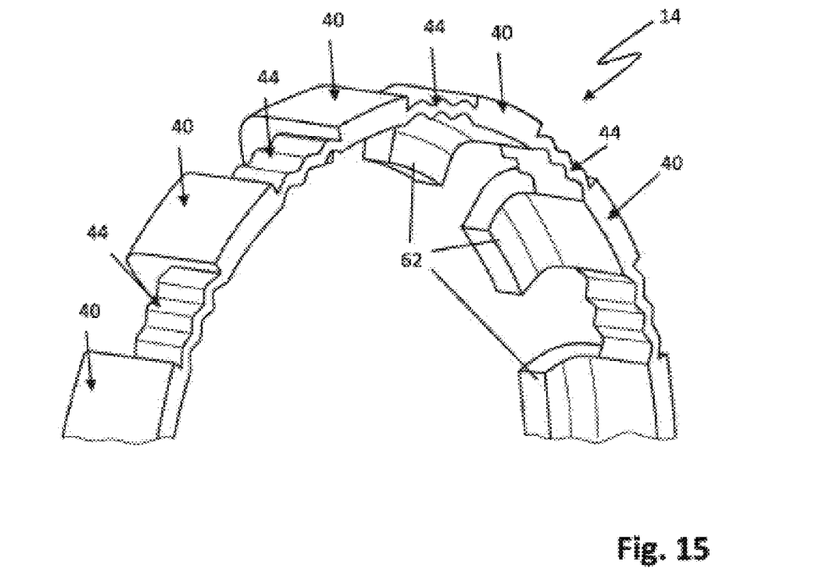
FIG. 15 is the supporting ring according to FIG. 14 in an isolated perspective partial view.

The supporting ring 14 can also be formed as an installation aid or as a fixing aid for the sealing ring 10. Thus the first ring segments 40 can have an angled, in particular L-shaped base shape according to FIGS. 14 and 15, by means of which the sealing ring 10 can be fixed in the area of its retaining section 78 in a retaining groove of a machine element (see FIG. 2). According to FIG. 15, the sealing ring can have two sealing lips 26 which seal in the radial direction and serve to dynamically seal a sealing surface of another machine element.

Figure 16:
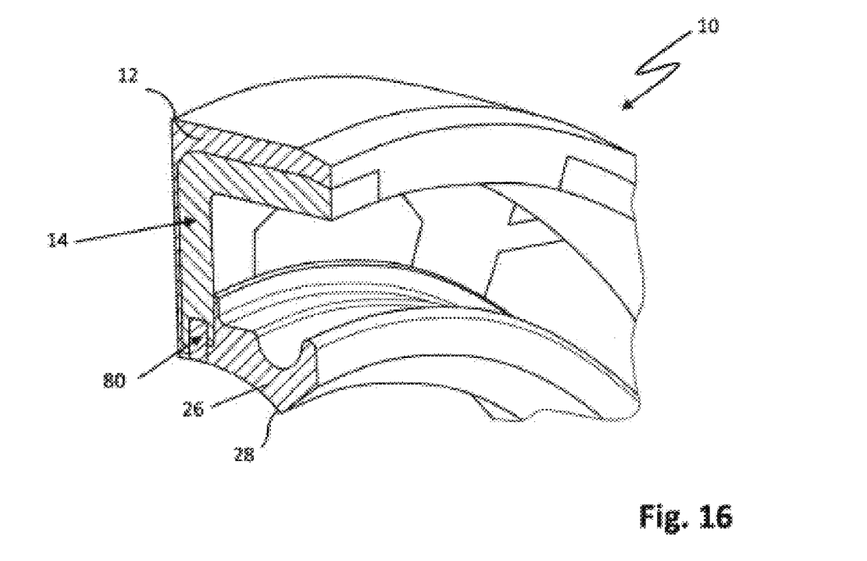
FIG. 16 is a sealing ring with a two-part supporting ring in a sectional perspective partial view.
Figure 17:
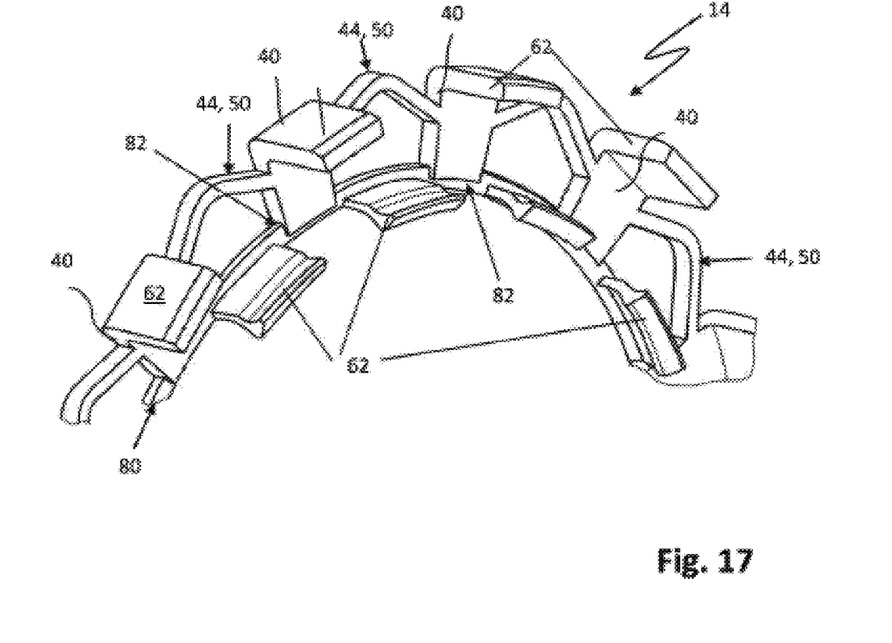
FIG. 17 is the supporting ring of the sealing ring according to FIG. 16 in an isolated perspective partial view.

A further sealing ring 10 is shown in FIG. 16, where an additional supporting or stiffening ring 80 is arranged on the supporting ring 14. The supporting ring 14 has a substantially L-shaped cross-sectional shape and is used to fix the sealing ring 10 in a retaining groove of a machine element and to reinforce the polymer material 12. The first and second ring segments 40, 44 are easy to identify. The first ring segments 40 or their tongue-like supporting extensions 62 have, according to the isolated representation of the supporting ring 14 as well as the stiffening ring 80 in FIG. 17, fixtures 82 in which the stiffening ring 80 is retained. The stiffening ring 80 can be clipped or pressed into the fixtures 82 of the supporting ring 14.

The stiffening ring 80 is ring-shaped closed and has tongue-like supporting extensions 62 which extend into the sealing lip 26 of the sealing ring. Here the supporting extensions 62 are arranged at a distance from each other in the circumferential direction of the sealing ring 10. The supporting extensions 62 can be connected to each other via connecting webs (see FIG. 9).

The stiffening ring 80 is also advantageously configured as a 3D-printed part and accordingly has a layered construction not shown in detail in the drawing.

Figure 18:
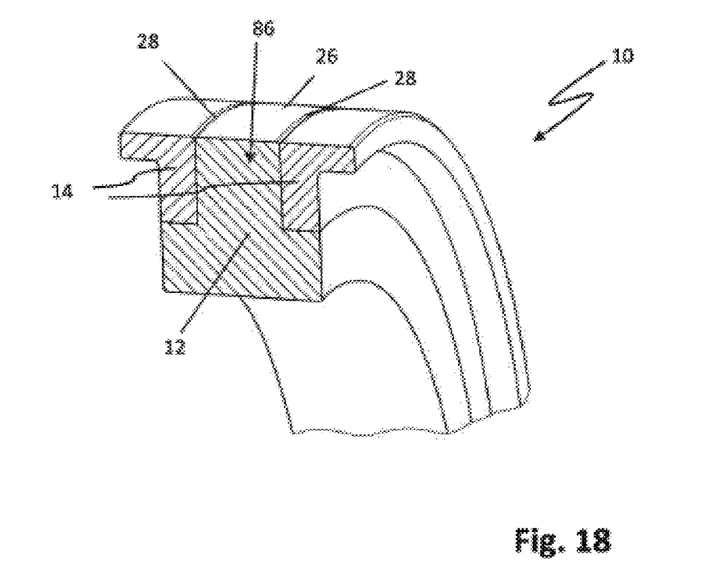
FIG. 18 is a sealing ring having a supporting ring optimized for support and guidance function, in a sectional perspective detail view.
Figure 19:
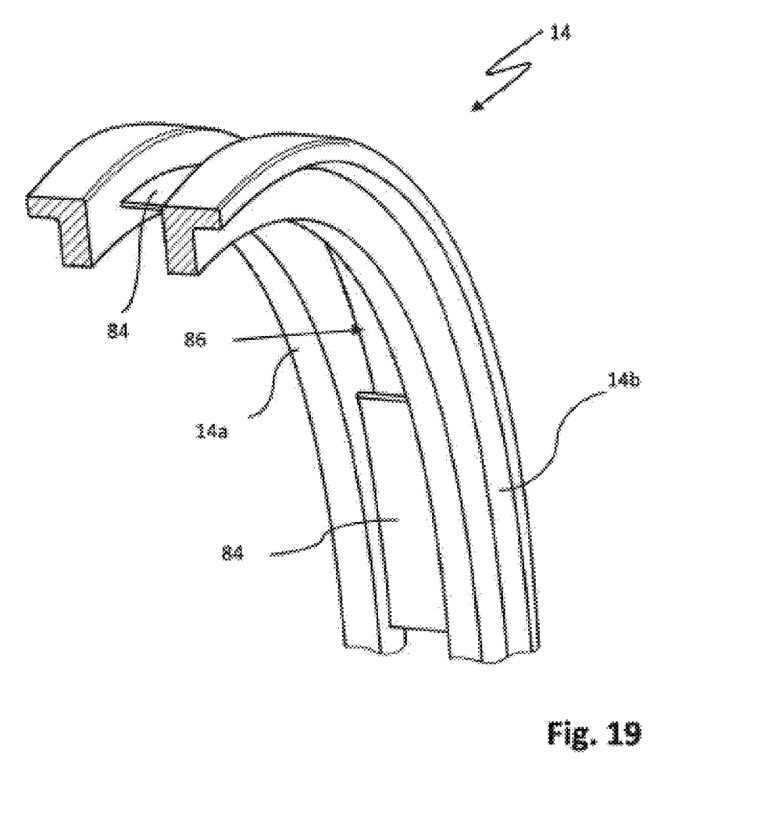
FIG. 19 is the supporting ring of the sealing ring according to FIG. 19 in an isolated perspective partial view.

FIG. 18 shows a further sealing ring 10, in which the supporting ring 14, which is shown in FIG. 19 in an isolated detail section, has two ring halves 14a, 14b arranged as to run parallel and spaced apart from each other. The supporting ring is made in one piece. For this purpose, the two ring halves 14a, 14b are connected to each other via bridge or connecting segments 84. The connecting segments 84 are formed on both ring halves. The connecting segments 84 are arranged at a distance from each other in the circumferential direction of the supporting ring 14. The two ring halves 14a, 14b can each have an L-shaped cross-sectional shape. The polymer material penetrates the gap 86 arranged between the two ring halves.

The supporting ring 14 of the sealing rings 10 described above and also the stiffening ring 80 can have a corrugated or grooved surface structure in whole or in part in order to enable a further improved adhesive or form fitting bond with the polymer material 12 of the sealing ring 10.

Figures 20A, 20B, 20C:
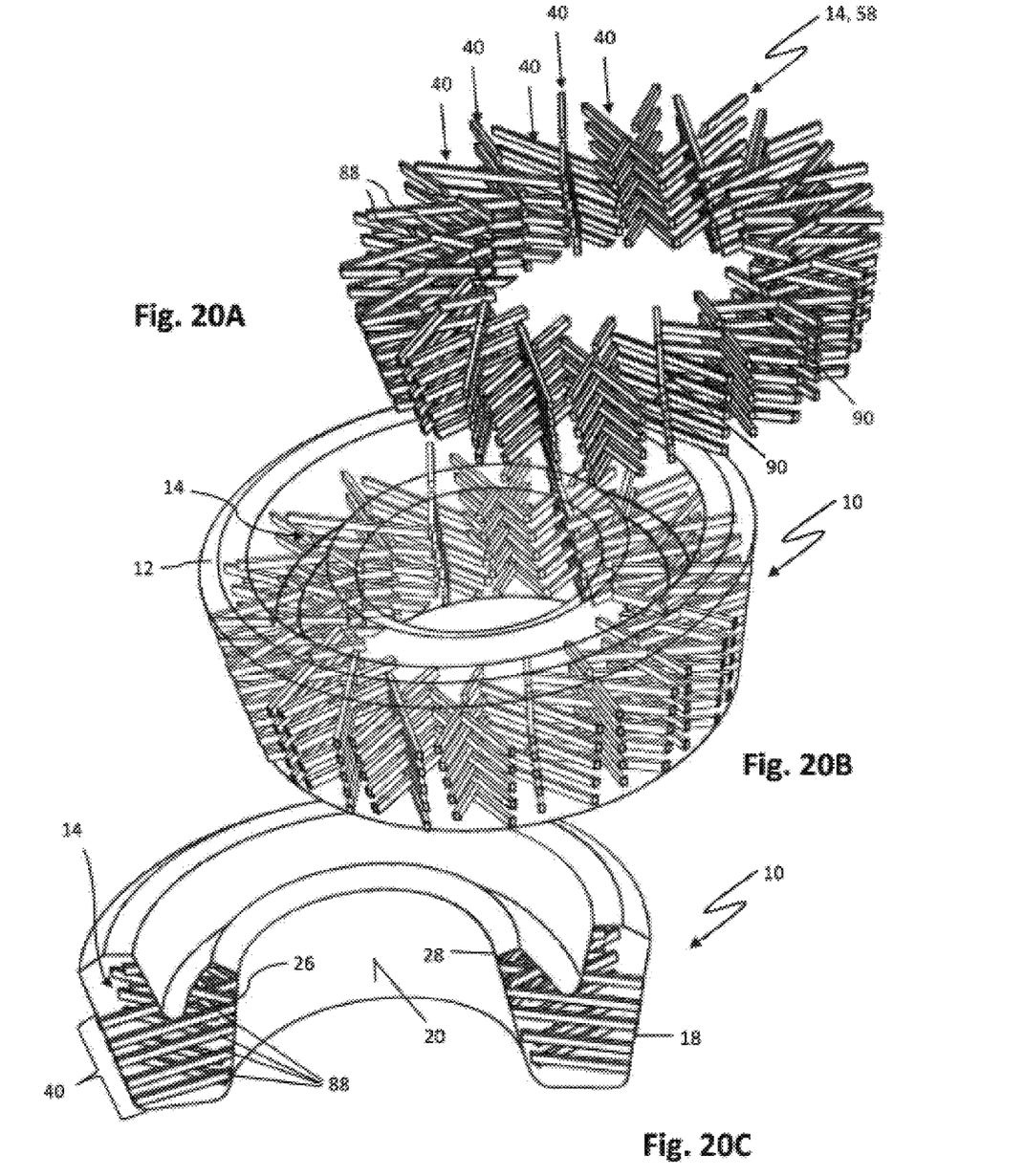
FIG. 20A is a supporting ring which comprises a plurality of profile webs connected to one another in an articulated manner.
FIG. 20B is a sealing ring having the supporting ring shown in FIG. 20a in a partially transparent representation.
FIG. 20C is the sealing ring according to 20B in a sectional representation.

The FIG. 20 show a very special embodiment of a sealing ring 10. The sealing ring 10 is shown in FIG. 20b in a perspective view and in FIG. 20C in a sectional view. FIG. 20A shows the supporting ring 14 of the sealing ring 10 in an isolated perspective view. The supporting ring 14 has dimensionally stable first ring segments 40 which are each formed by a plurality of profile webs 88 which are arranged one behind the other (one above the other) at a distance from one another in the direction of the center axis 16 of the sealing ring 10. At least some of the profile webs 88 of two directly adjacent first ring segments 40 mesh alternately with one another and are at least partly connected at their respective crossing points 90. The supporting ring 14 and thereby the entire sealing ring 10 can therefore be expanded resiliently in a radial direction with respect to the center axis 16. The supporting ring 14 can therefore also conduce here to an elastically prestressed contact of the dynamic sealing lip 26 of the sealing ring 10 with an associated sealing surface of a machine element (see FIG. 2). The profile webs 88 of the supporting ring 14 can extend to the outside of the sealing ring 10 at least in sections. This is the case here in the area of the inner radial and outer radial circumferential sides 20, 18 of the sealing ring 10. In the embodiment of a supporting ring 14 shown in FIG. 20, a particularly durable adhesive or form fitting bond of the supporting ring 14 with the polymer material 12 is achieved not least due to the large surface of the supporting ring that can be wetted and enclosed with the polymer material 12.

What is claimed is:

1. A sealing ring for sealing a sealing gap arranged between two machine elements, comprising:
    an elastically deformable polymer material and a supporting ring which is embedded in a positively locking manner in the polymer material at least in sections;
    wherein the supporting ring is configured as a 3D-printed part with a multi-layer construction of its material at least in sections;
    wherein the material of the supporting ring has a greater modulus of elasticity than the polymer material, wherein the supporting ring can be widened elastically in a radial direction with respect to the center axis of the sealing ring and has dimensionally stable first ring segments which are connected to one another in an articulated manner in the circumferential direction of the sealing ring:
    wherein the first ring segments are arranged spaced apart from one another in the circumferential direction of the sealing ring and are each connected to one another via a second ring segment which is elastically deformable at least in sections; and
    wherein the second ring segments each have at least one profile leg pair having a first and a second profile leg, which are connected to one anther via a back section and which can be spread out elastically relative to one another.

2. The sealing ring according to claim 1, wherein the polymer material is molded onto the supporting ring.

3. The sealing ring according to claim 2, wherein the polymer material of the sealing ring has a lower melting point than the material of the supporting ring.

4. The sealing ring according to claim 1, wherein at least a part of the second ring segments comprises a plurality of profile leg pairs which are arranged one behind the other in the circumferential direction and are connected to one another in a firmly-bonded end-to-end manner.

5. The sealing ring according to claim 1, wherein the surface of the sealing ring is formed by the supporting ring at least in sections.

6. The sealing ring according to claim 5, wherein the supporting ring protrudes beyond a surface section of the sealing ring formed by the polymer material.

7. The sealing ring according to claim 1, wherein the supporting ring forms one axially running fluid channel or a plurality of such fluid channels at least in sections.

8. The sealing ring according to claim 1, wherein the sealing ring has a sealing lip having a dynamic sealing edge, wherein the supporting ring is arranged inside the sealing lip at least in sections.

9. The sealing ring according to claim 8, wherein the supporting ring extends in sections or circumferentially into the sealing lip.

10. The sealing ring according to claim 1, wherein the supporting ring is provided with axially or radially running through bores, wherein the polymer material extends into the through bores.

11. A sealing ring for sealing a sealing gap arranged between two machine elements, comprising:

an elastically deformable polymer material and a supporting ring which is embedded in a positively locking manner in the polymer material at least in sections;

wherein the supporting ring is configured as a 3D-printed part with a multi-layer construction of its material at least in sections;

wherein the material of the supporting ring has a greater modulus of elasticity than the polymer material, wherein the supporting ring can be widened elastically in a radial direction with respect to the center axis of the sealing ring and has dimensionally stable first ring segments which are connected to one another in an articulated manner in the circumferential direction of the sealing ring; and wherein the first ring segments are each formed by a plurality of profile webs which are arranged one behind the other, spaced apart from one another, in the direction of the center axis of the sealing ring, wherein the profile webs in each case of two first ring segments arranged directly adjacent to one another alternately mesh with one another and are connected to one another in an articulated manner in the area of their crossing points.

12. The sealing ring according to claim 11, wherein the polymer material is molded onto the supporting ring.

13. The sealing ring according to claim 11, wherein the polymer material of the sealing ring has a lower melting point than the material of the supporting ring.

* * * * *